H. P. SULLIVAN.
CORN AND SEED-PLANTER.

No. 170,412.    Patented Nov. 23, 1875.

Witnesses:
Frank Burnham.
Wm Bagger

Inventor:
Hamlet P. Sullivan
By Parker H. Sweet Jnr. & Co.
Attys.

UNITED STATES PATENT OFFICE.

HAMLET P. SULLIVAN, OF XENIA, ILLINOIS.

IMPROVEMENT IN CORN AND SEED PLANTERS.

Specification forming part of Letters Patent No. 170,412, dated November 23, 1875; application filed August 30, 1875.

*To all whom it may concern:*

Be it known that I, HAMLET P. SULLIVAN, of Xenia, in the county of Clay and State of Illinois, have invented certain new and useful Improvements in Corn and Seed Planters; and I do hereby declare that the following is a full, clear, and exact description thereof, which will enable others skilled in the art to which it pertains to make and use the same, reference being had to the accompanying drawing, and to the letters of reference marked thereon, which form a part of this specification.

My invention relates to new and useful improvements in machines for planting corn and other seed, such as pease, beans, &c.; and the novelty consists in the general construction and arrangement of the several parts, all as will be hereinafter more fully described, and pointed out in the claim.

Figure 1:
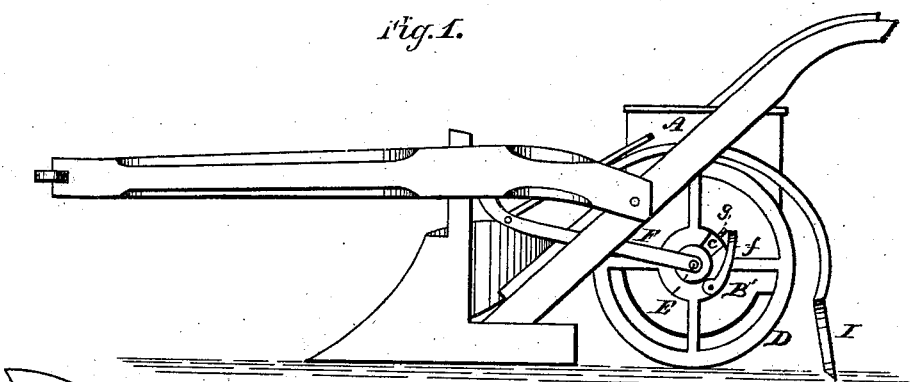
Figure 2:
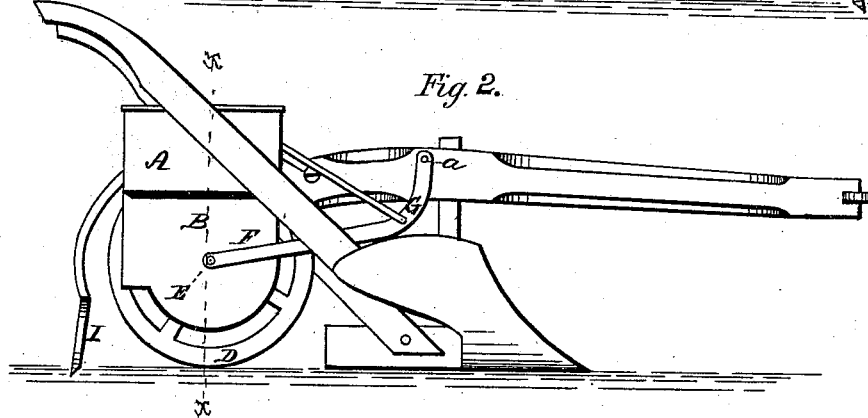
Figure 3:
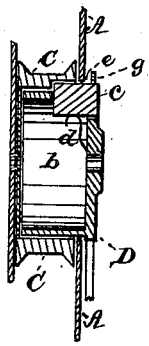
Figure 4:
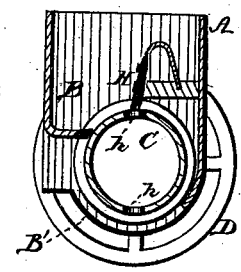

Referring to the drawings, Figures 1 and 2 are side elevations of my improvements attached to an ordinary plow. Fig. 3 is an enlarged transverse section of the seed-cylinder and bearing-wheel. Fig. 4 is a longitudinal vertical section.

Similar letters of reference occurring on the several figures indicate corresponding parts.

A represents a rectangular box, one end of which is depressed, so as to form a hopper, B, having a portion of its bottom open to allow the circumference of the seed-cylinder C to pass through, said box being provided at its base with a wheel-case, B', in which the seed-cylinder revolves. D represents the driving-wheel, which has a hollow axle, $b$, adapted to fit into the hollow seed-cylinder C, as shown in Fig. 3, a lug, $c$, being arranged in the circumference of said axle to couple the driving-wheel and seed-cylinder together or to uncouple the two. This lug $c$ is held in position by an inner spring, $d$, in the hollow shaft, to force the same and retain it in the slot $e$, arranged in the inner circumference of the seed-cylinder, when it is desired to use the same; but when the seed-cylinder is desired to be at rest the outer spring $f$ is placed down upon the lug $c$, behind the pin $g$, thus releasing the lug $c$ from the slot $e$, and allowing the driving-wheel D to revolve separate by itself and independent of the seed-cylinder. A shaft, E, passes transversely through the driving-wheel and seed-cylinder, the ends being journaled in the side arms F, which terminate in a single arm, G, which is pivoted to the draft-pole, as shown at $a$ in Fig. 2.

The object of this construction is to allow the seeding apparatus to rise and fall with any irregularity of the ground which may be encountered while the operation of planting is going on.

The seed-cylinder C is provided with cells $h$, arranged within its circumference, as shown in Fig. 4, and capable of holding four or five grains of corn or other seed; which being poured into the hopper B, and the plow being put in motion, the driving-wheel D revolves, carrying the seed-cylinder with it, and as the cells $h$ come around through the bottom of the hopper they are filled with seed, the surplus being brushed off by the broom H, and passing around are dropped into the furrow made by the plow at regular intervals, and covered up by the colters or coverers I, arranged behind the seeding apparatus, as shown in Figs. 1 and 2.

In planting pease or beans two or more seed-cylinders may be used by constructing the hollow shaft E long enough to accommodate as many seed-cylinders as may be desired, and by enlarging the width of the cases A and B to cover them.

Having thus described my invention, what I claim as new, and desire to secure by Letters Patent, is—

In a seed-planter, constructed as hereinbefore described, the combination of the driving-wheel D, having the lug $c$, operated by the springs $f$ and $g$, with the seed-cylinder C, provided with the recess $e$ in its inner circumference, said cylinder C being arranged upon the hollow axle of the driving-wheel, substantially in the manner as and for the purpose specified.

In testimony that I claim the foregoing as my own invention I affix my signature in presence of two witnesses.

HAMLET P. SULLIVAN.

Witnesses:
BENJ. B. THOMAS,
L. J. HAMMACK.